United States Patent
Rode et al.

(10) Patent No.: US 9,586,477 B2
(45) Date of Patent: Mar. 7, 2017

(54) FRONT WHEEL DRIVE BASED POWER TRANSFER UNIT (PTU) WITH HYDRAULICALLY ACTUATED DISCONNECT

(71) Applicant: BorgWarner Inc., Auburn Hills, MI (US)

(72) Inventors: John H. Rode, Swartz Creek, MI (US); Jeremy L. Cradit, Grand Blanc, MI (US); Magnus F. Persson, Viken (SE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/693,964

(22) Filed: Apr. 23, 2015

(65) Prior Publication Data
US 2015/0314679 A1 Nov. 5, 2015

Related U.S. Application Data

(60) Provisional application No. 61/987,608, filed on May 2, 2014.

(51) Int. Cl.
| | |
|---|---|
| *B60K 23/08* | (2006.01) |
| *B60K 17/346* | (2006.01) |
| *F16D 25/08* | (2006.01) |
| *B60K 17/35* | (2006.01) |
| *B60K 5/04* | (2006.01) |

(52) U.S. Cl.
CPC .......... B60K 23/08 (2013.01); B60K 17/3467 (2013.01); B60K 17/35 (2013.01); F16D 25/08 (2013.01); *B60K 5/04* (2013.01); *B60K 2023/0833* (2013.01); *B60K 2023/0866* (2013.01)

(58) Field of Classification Search
CPC .............................. B60K 23/08; B60K 17/354
USPC ......................................... 180/247; 74/665 F
See application file for complete search history.

(56) References Cited

U.S. PATENT DOCUMENTS

| | | | |
|---|---|---|---|
| 3,195,556 A | 7/1965 | Norstrud et al. | |
| 8,534,409 B2 * | 9/2013 | Sigmund ............ | B60K 23/0808 180/247 |
| 9,022,158 B2 * | 5/2015 | Mita ...................... | B60K 17/34 180/233 |
| 2007/0029127 A1 * | 2/2007 | Mori .................... | B60K 17/344 180/247 |
| 2009/0277711 A1 * | 11/2009 | Hoffmann .......... | B60K 23/0808 180/247 |
| 2010/0044138 A1 * | 2/2010 | Marsh .................. | B60K 17/348 180/247 |
| 2010/0331132 A1 | 12/2010 | Pritchard et al. | |
| 2011/0179906 A1 * | 7/2011 | Juenemann ............ | B60K 17/35 74/665 F |

* cited by examiner

Primary Examiner — Tony Winner
(74) Attorney, Agent, or Firm — Warn Partners, P.C.

(57) ABSTRACT

An arrangement of a vehicle is provided having normal transverse engine/transmission normal two-wheel drive operation which can be selectively placed into four-wheel drive operation wherein a pump which powers the coupling or uncoupling can be positioned downstream of a power takeoff unit without utilization of an electrically powered pump or transmission powered pump.

15 Claims, 5 Drawing Sheets

FRONT WHEEL DRIVE BASED POWER TRANSFER UNIT (PTU) WITH HYDRAULICALLY ACTUATED DISCONNECT

CROSS-REFERENCE TO RELATED APPLICATIONS

This application claims priority to U.S. Provisional Patent Application No. 61/987,608, filed May 2, 2014.

FIELD OF THE INVENTION

The present invention relates to arrangement of front wheel drive vehicles transverse mounted engines with four wheel drive capabilities upon demand.

BACKGROUND OF THE INVENTION

To increase fuel economy, many vehicles have been switched over to front wheel drive so that the vehicle engine's weight can be over the main traction axle of a vehicle. To further increase fuel economy, many front wheel drive vehicles utilize a transverse mounted engine and transmission. To provide improved performance in inclement weather, many vehicles have selective four wheel drive capabilities. Typically in most front wheel drive vehicles with four wheel drive capability, the transmission powers a front differential. Torsionally downstream of the front differential is a power takeoff unit (PTU). The PTU couples the front differential with a prop shaft extending longitudinally to a rear axle and differential. To maximize fuel efficiency in selective four wheel drive vehicles, it is desirable to torsionally not only cut off the rear axle from the vehicle engine, but additionally cause the propeller (prop) shaft and most of the PTU to stop rotating. For quickest actuation/shift time for the demand of four wheel drive, the PTU requires some type of hydraulic actuation from a pressure source. Typically, it is not desirable to use the transmission pump as a source of pressurized fluid since it is expensive to increase the capacity of the transmission pump and because of the hydraulic line routing required between the transmission and PTU. It has been customary that the PTU hydraulic actuation be supplied by an auxiliary electric pump so that the coupling and uncoupling of the prop shaft from the vehicle engine can occur when the vehicle has previously been in an uncoupled condition. It is desirable to provide an arrangement of a vehicle wherein a pump for the PTU can be placed torsionally downstream of the coupling/uncoupling mechanism while still not requiring an auxiliary electric pump. It is also desirable to provide the pressurized hydraulic fluid necessary for the coupling function without utilizing the hydraulic pump typically associated with the transmission.

SUMMARY OF THE INVENTION

To meet the above noted desires and to provide other advantages, a revelation of the present invention is brought forth. The present invention brings forth an arrangement of a vehicle having normal transverse engine/transmission normal two wheel drive operation which can be selectively placed into four wheel drive operation wherein the pump which powers the coupling or uncoupling can be downstream of the PTU that without utilization of an electrically powered pump or transmission pump.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
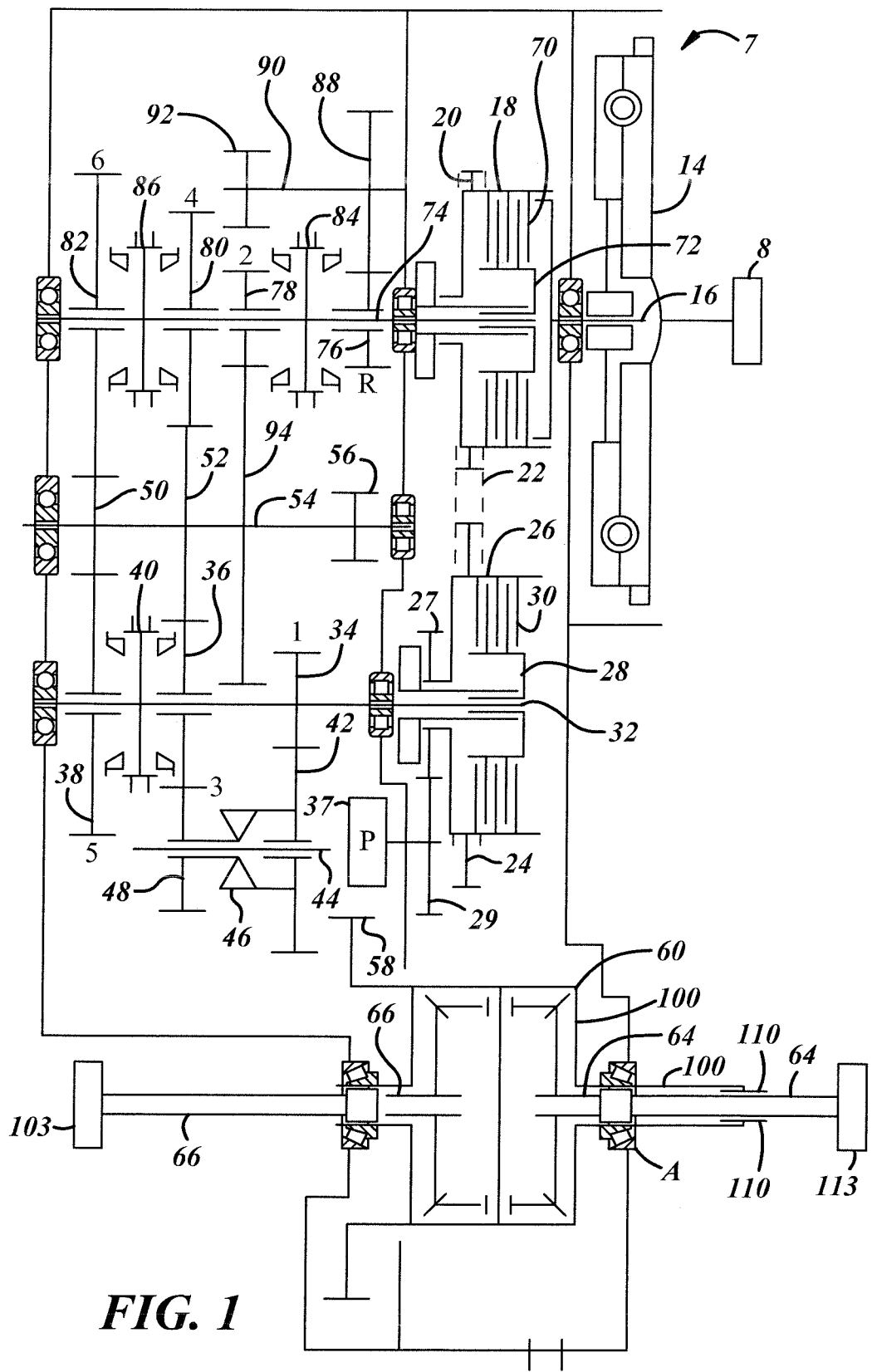
FIG. 1 is a schematic view of the transmission in the arrangement of an automotive passenger vehicle having normal front-wheel drive and selective four-wheel drive according to the present invention.
Figure 2:
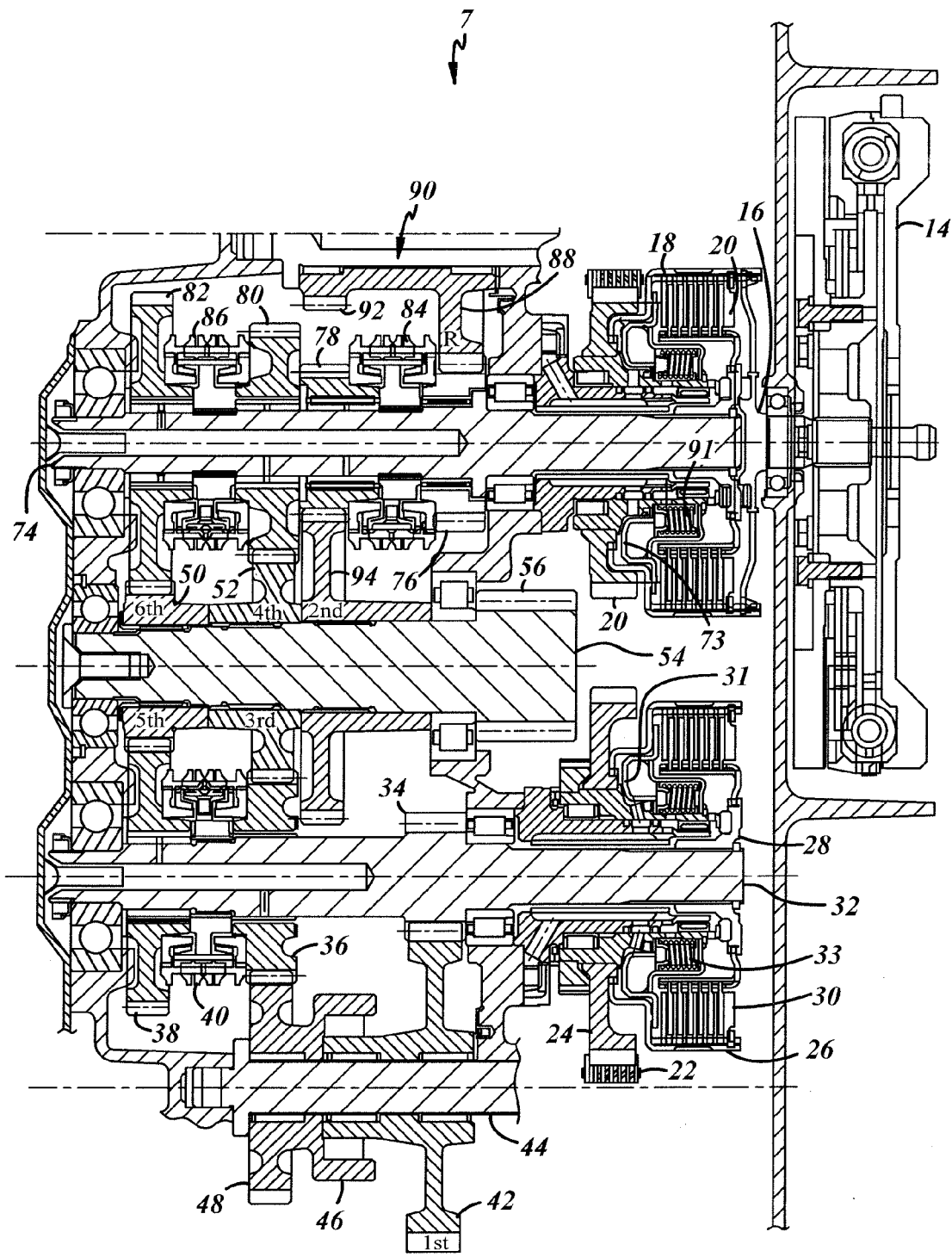
FIG. 2 is a sectional view of the transmission shown in FIG. 1.
Figure 3:
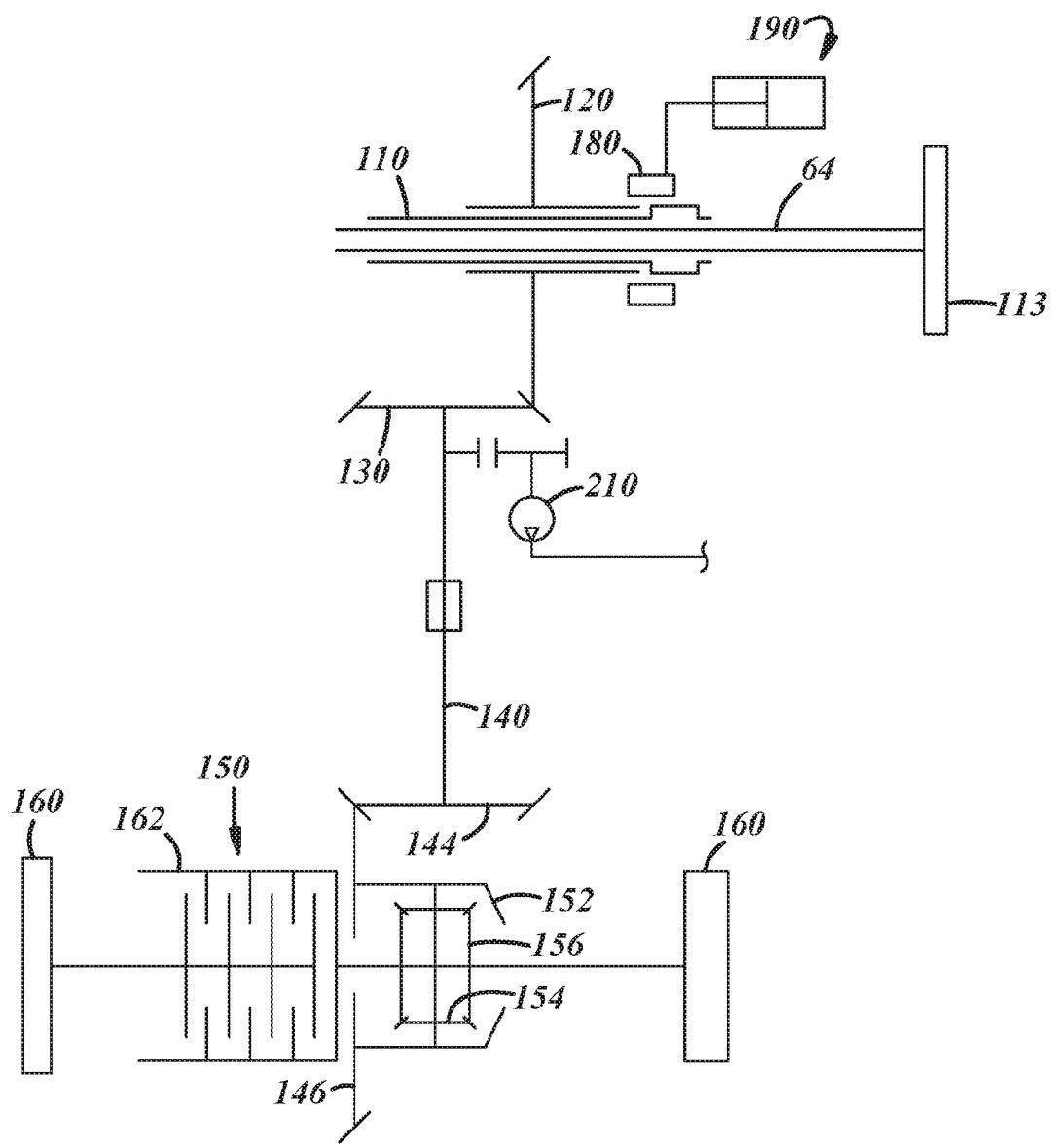
FIG. 3 is a schematic view of the remainder of a power train of the invention shown in FIGS. 1 and 2.

Referring to FIGS. 1, 2 and 3, a transverse mounted engine 8 of a normally front wheel drive selectively four wheel drive vehicle arrangement powers a six speed dual clutch transmission 7 of the present invention. The engine 8 typically will have a fly wheel connected with a damper 14. The damper is torsionally connected with a first clutch input shaft 16. The first clutch input shaft 16 is connected with a first clutch housing 18. The first clutch housing 18 is torsionally connected with a sprocket 20. The sprocket 20 is torsionally connected with a chain 22. The chain 22 is torsionally engaged with a second clutch housing sprocket 24. The second clutch housing sprocket 24 is fixably connected with a second clutch housing 26. The first clutch housing sprocket 20 has a diameter that is smaller than the diameter of the second housing sprocket 24; consequently, the first clutch housing 18 spins faster than the second clutch housing 26.

The second clutch housing 26 is selectively connected with a hub 28 via a friction pack 30. The housing 26 also has a gear that powers an output gear 29 powering an oil pump 37. A clutch actuator piston 31 is provided to engage the friction pack 30 with the hub 28. The hub 28 is torsionally connected with a second input shaft 32. The second input shaft 32 has torsionally affixed thereto, a first gear ratio input gear 34. The second input shaft 32 also has rotatably mounted thereon third gear ratio input gear 36 and fifth gear ratio input gear 38. To torsionally selectively connect the fifth input gear 38 or the third input gear 36 with the second input shaft 32, there is provided a fifth/third synchronizer 40.

The first input gear 34 is continually meshed with an idler gear input gear 42. The idler gear input gear 42 is rotatably mounted on an idler shaft 44. The idler shaft input gear 42 is torsionally connected via a one-way clutch 46 with an idler shaft output gear 48. The idler shaft output gear 48 is in continual mesh with the third input gear 36.

Fifth input gear 38 is in mesh with a fifth output gear 50. Third input gear 36 is meshed with a third output gear 52. Output gears 50 and 52 are torsionally affixed to an output shaft 54. Output shaft 54 also has torsionally affixed thereto a final drive pinion 56. Final drive pinion 56 is meshed with a differential input gear 58. Differential input gear 58 is a ring gear which is connected with a front differential casing 60 (sometimes referred to as a housing) which in turn drives two axial shafts 64 and 66. In other embodiments, (not shown), the transmission can have dual output shafts similar to that shown in "DCT TRANSMISSION UTILIZING TWO AXIS CHAIN", U.S. Provisional Application No. 61/269,781, filed Jun. 29, 2009, to Pritchard et al.

The first clutch housing 18 via a friction pack 70 is selectively torsionally engaged with a hub 72 which is splined to a first input shaft 74. The first input shaft 74 rotatably mounts a reverse drive input gear 76, a second gear ratio input gear 78, a fourth gear ratio input gear 80 and a sixth gear ratio input gear 82. The reverse drive or input gear 76 is in a bisecting coaxial plane of the final drive pinion 56. To torsionally affix the reverse input gear 76 or the second input gear 78 with the first input shaft 74, there is provided a second/reverse synchronizer actuator 84. To torsionally connect the sixth input gear 82 or the fourth gear ratio input gear 80 with the first input shaft 74, there is provided a sixth fourth synchronizer 86. The reverse input gear 76 is continually meshed with a reverse idler shaft input gear 88 which is in turn torsionally connected via reverse idler shaft 90 with a reverse idler shaft output gear 92 which meshes with a second output gear 94. Gear 50 also serves as an output gear for sixth input gear 82. Gear 52 also functions as an output gear for the fourth input gear 80.

The front differential 60 casing 100 is torsionally connected with a rear input shaft 110. The front differential also has a side gear connected with a wheel shaft 64. The wheel shaft 64 is connected via a half shaft (not shown) with a wheel 113. The wheel shaft 64 extends through a rear axle input shaft 110. On the opposite side of the front differential 60 is a wheel shaft 66 which via a half shaft (not shown) is connected with a wheel 103.

Figure 4:
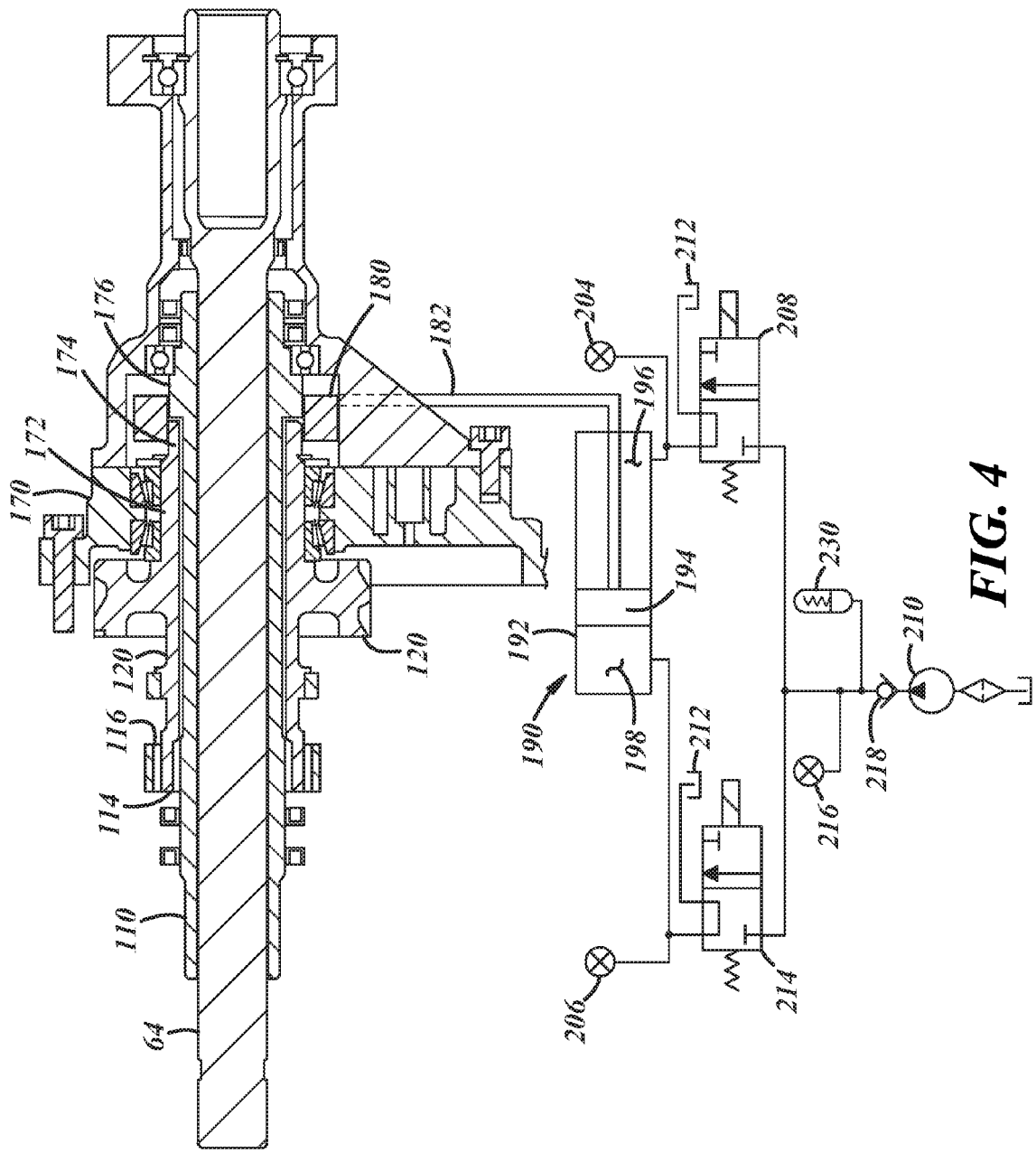
FIG. 4 is a sectional with partial schematics of an actuator utilized for selectively coupling a rear axle input gear with a rear axle input shaft of the arrangement shown in FIGS. 1-3.

Referring additionally to FIG. 4, the casing 100 of the front differential in a manner similar to transmission 7 extends transversely to a main axis of the vehicle. The rear axle input shaft 110 is spline connected to the differential casing 100. Rotatably mounted on the rear axle input shaft is a rear axle input gear 120. The rear axle input gear 120 either directly or through a series of intermediate gears is torsionally connected with a prop shaft input gear 130. Prop shaft input gear 130 is connected with a longitudinally rearward extending prop shaft 140. The prop shaft 140 may be a single elongated member or a plurality of members joined by universal joints. The end of the prop shaft 140 has connected thereto an output gear 144. The output gear 144 is torsionally connected with a ring gear 146 of a rear axle differential 150. Rear differential 150 has a casing 152 with drive gears 154. Drive gears 154 mesh with side gears 156. Side gears 156 are connected with rear wheel shafts 158 which are in turn connected with rear wheels 160. In a first state of operation the rear axle differential 150 differentially powers the rear wheels 160. The rear axle differential 150 has a clutch 162 which can selectively couple the side gears 156 of the rear differential with the rear wheels 160. When the clutch 162 is open, the ring gear 146 and the casing 152 and prop shaft output gear 144 and prop shaft 140 do not have rotational movement. However, the rear wheels 160 will rotate upon any movement of the vehicle even though the rear wheels 160 are unpowered. Rear axle differential 150 in a second state of operation wherein the clutch 162 is open, the wheels 160 are non-driven and can freewheel with respect to one another.

The rear axle input gear 120 is typically a helical gear that is mounted by bearings in the power take off unit 170. The rear axle input gear has a shaft extension 172 having a flat 174 which is splined along its outer surface. The rear axle input shaft along its inner diameter also has a splined flat 176.

To selectively couple the rear axle input gear 120 with the rear axle input shaft 110, there is provided a shift collar 180. The shift collar 180 is connected with and is translated by a shaft of a hydraulic actuator 190. The hydraulic actuator 190 includes a cylinder 192. A piston 194 is connected with the shaft 182. The piston 194 sealably bifurcates the cylinder into two pressure chambers 196, 198 each side of the piston. The pressure in chamber 196 can be determined from a pressure sensor 204 and the pressure in chamber 198 can be determined from a pressure sensor 206. Pressure chamber 196 is controlled by a solenoid 208 to either be fluidly connected with a pump 210 or a sump 212. Pressure chamber 198 is controlled by a solenoid valve 212 to be alternatively connected with the pump 210 or with the sump 212. A pressure sensor 216 monitors the pressure in the hydraulic line delivered by pump 210 after it passes through check valve 218. Fluidly connected with the chambers 196 and 198 via the solenoid valves 208 and 214 respectively is an accumulator 230. The pump 210 is torsionally connected with the rear axle output gear 120 and may be directly meshed therewith or with a gear downstream thereof or with a gear torsionally connected with the prop shaft 140. However, when the gear 120 is not rotational, there is no power input into the pump 210.

To provide for fluid pressure to power the actuator 190 (when the rear axle output gear 120 is not rotating), there is provided the accumulator 230. The pressure in the actuator is monitored by the pressure sensor 216. The accumulator 230 is fluidly connected with both the actuator 190 and the pump 210 and typically will be charged to an amount to have at least four engagements of the actuator to couple the rear axle input gear 120 with the rear axle input shaft 110 without being recharged. Therefore if the vehicle is in a two wheel drive mode of operation which is typically its normal mode of operation there is sufficient pressurized fluid within the accumulator 230 to actuate to translate the shift collar from its non-actuated position to its actuated position. Upon being actuated, hydraulic pressure will be developed by pump 210 and the accumulator 230 will be recharged. An advantage of the vehicle arrangement of the present invention is that an auxiliary electric pump is not required and it allows for advantages of placement of the hydraulic pump in a position wherein the pump is powered torsionally downstream of the rear axle input gear 120 to allow for better location of the pump. Additionally, hydraulic pressure is not required from the transmission 7 which would require a larger transmission pump and possibly cumbersome fluid line routing between the actuator and the transmission 7.

Figure 5:
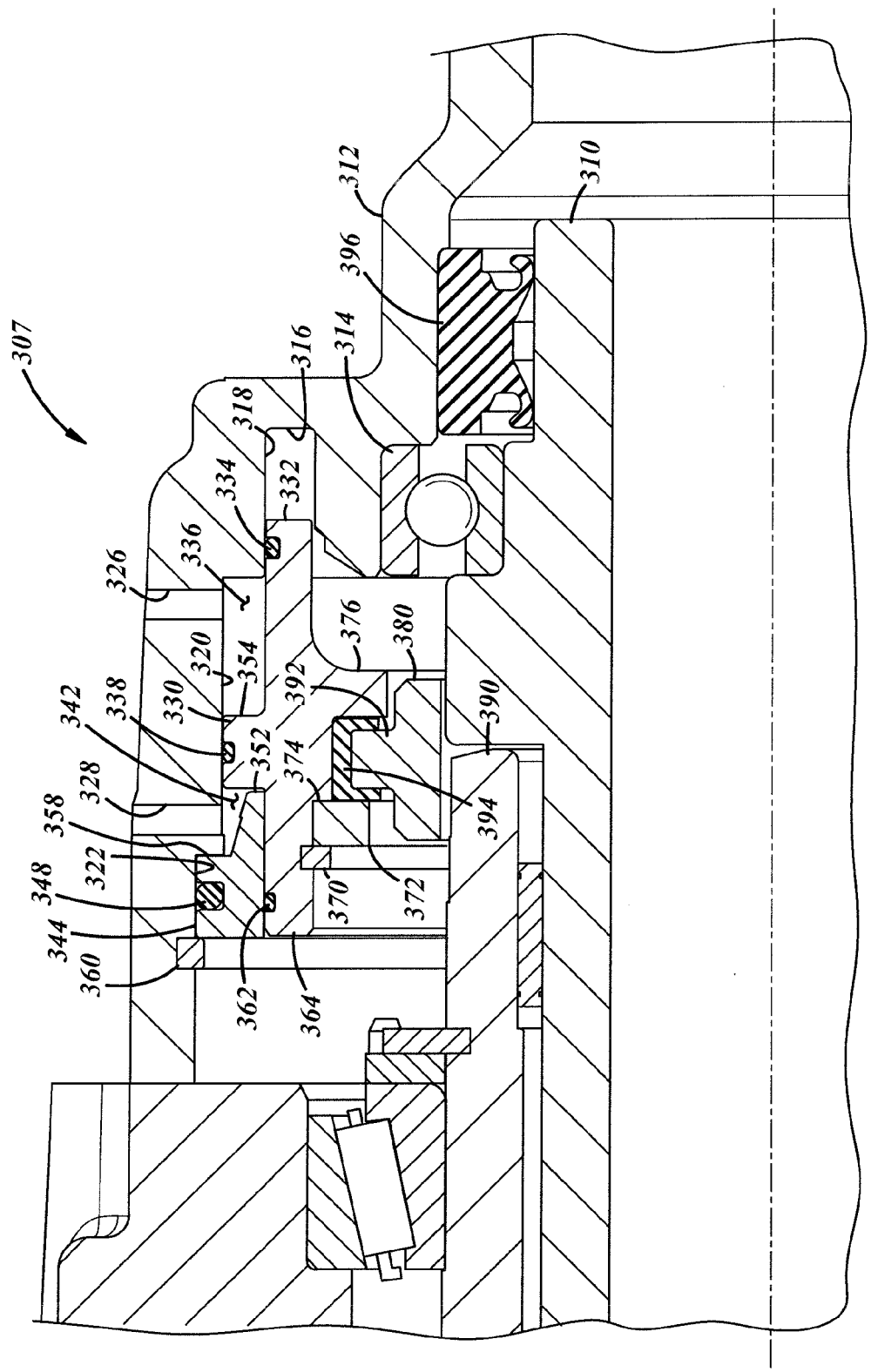
FIG. 5 is a partial sectional view of alternative embodiment actuator utilized in the arrangement of a normal front-wheel drive selective four-wheel drive vehicle illustrating an actuator for selectively coupling or uncoupling a rear axle input gear with a driving member.

Referring to FIG. 5 an embodiment 307 of the present invention has a driving member or rear axle input shaft 310. Shaft 310 is rotatably mounted within a PTU frame 312 by a bearing 314 and is sealed by a seal 396. The frame 312 has a rectangular cross-sectional angular groove 316 with a first outer radius 318. The frame 312 also has a second outer radius 320 and a third outer radius 322. Second outer radius 320 is intersected with an applied pressure bore 326 and a release pressure bore 328.

An aluminum piston 330 is provided. The piston 330 has a leg 332 aligned by the frame groove 316. The piston leg 332 has an outer radial surface seal 334 to seal an apply chamber 336 that is fluidly connected with the apply pressure bore 326. The seal 334 seals at the second radius 318. The piston 330 also has a seal 338 sealing at radius 320 to separate the apply chamber 336 from a release chamber 342. The release chamber 342 fluidly connects with the release pressure bore 328. A stopper 344 has a seal 348 which seals chamber 342. Stopper 344 has a point 352 that limits axial travel of a radial arm 354 of the piston 330. The stopper 344 abuts a shoulder 358 of the frame 312. The stopper 344 is held in position by a snap ring 360. The stopper 344 inner radial surface is sealed by a piston seal 362 in a head 364 of the piston. Seal 362 is at the same radius as seal 334. The seal 362 seals the apply pressure chamber 342. Along its inner radius, the piston 332 has an annular groove to hold in a snap ring 370. The snap ring 370 retains an aluminum blocker ring 372 against a shoulder 374 of the piston. The piston has a blocker portion 376. A steel shift collar 380 is shown in FIG. 5 spline connected along its inner radius with a driving member produced by the rear axle input shaft 310 and with an extension of a rear axle input gear 390. The shift collar 380 has a head 392 covered with a polymeric plastic bumper 394 for contact with the blocker portion 376 of the piston and the blocker ring 374. To actuate the shift collar 380 to connect the driven rear axle input shaft 310 with the rear axle input gear 390, pressure chamber 336 is pressurized and pressure chamber 342 is relieved to sump. To disengage the rear axle of the vehicle to go back to two-wheel drive, pressure chamber 342 is pressurized and pressure chamber 336 is relieved to sump. A seal 392, bearing 314, piston 332, shift collar 380, and the remainder of the actuator components can all be assembled from the left side of the snap ring 360 as shown in FIG. 5.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement for an automotive passenger vehicle having normal front-wheel drive and selective four-wheel drive mode, said arrangement comprising:
   a transmission transversely mounted in said vehicle powered by a transversely-mounted vehicle engine;
   a front axle differential powered by said transmission having a casing extending transversely to a main axis of said vehicle, said front axle differential having front wheel shafts connecting with side gears for powering front wheel of said vehicle;
   a rear axle input shaft connected with said casing of said front axle differential, said rear axle input shaft encircling at least one of said front wheel shafts;
   a rear axle input gear rotatably mounted on said rear axle input shaft for powering a torsionally connected prop shaft;
   a rear axle differential torsionally connected with said prop shaft, said rear axle differential having a first state of operation differentially powering rear wheels and said rear axle differential having a second state where said rear wheels are non-driven and freewheel with respect to one another;
   a shift collar having a first position torsionally coupling said rear axle input shaft with said rear axle input gear and a second position decoupling said rear axle input gear with said rear axle input shaft;
   a hydraulic actuator for translating said shift collar;
   a hydraulic pump torsionally connected with said rear axle input gear for powering said hydraulic actuator; and
   an accumulator fluidly connected with said pump and said hydraulic actuator to supply pressurized hydraulic fluid to said actuator when said rear axle input gear is uncoupled from said rear axle input shaft.

2. The arrangement of claim 1 wherein said actuator includes a cylinder with a piston pressurizable on both sides of said piston.

3. The arrangement of claim 2 wherein said cylinder is connected with a pressure sensor provided on each side of said piston and wherein a pressure within said accumulator is monitored by another pressure sensor.

4. The arrangement of claim 2 wherein said actuator is provided inside of a frame of a power takeoff unit.

5. The arrangement of claim 4 wherein said actuator includes a piston having a leg aligned by a groove provided in a frame of a power takeoff unit.

6. The arrangement of claim 4 said actuator has an applied pressure chamber and a release pressure chamber sealed at a common radius.

7. The arrangement of claim 2 wherein said actuator includes a piston mounted inside a frame of a power takeoff unit and wherein said piston is fabricated from aluminum and said shift collar is fabricated from steel.

8. The arrangement of claim 7 wherein said actuator includes an aluminum piston contacting said steel shift collar via a plastic bumper.

9. The arrangement of claim 2 wherein said actuator is provided with a piston inside a frame of a power takeoff unit and the piston can be assembled within the power takeoff unit from one side of the power takeoff unit.

10. The arrangement of claim 2 wherein said actuator has a piston inside of the power takeoff unit and said piston is limited in axial travel by a stopper which also has a seal member sealing off a release pressure chamber of said actuator.

11. The arrangement of claim 2 wherein said piston is pressurized on two sides and each side has individual solenoid actuated control to deliver fluid to said side of said piston or to release said side of said piston to a sump.

12. The arrangement of claim 2 wherein said accumulator can supply at least four movements of said piston.

13. The arrangement of claim 1 wherein said rear axle differential has a ring gear torsionally connected with the prop shaft and said ring gear is connected with a rear casing having a clutch connection with one of said rear wheels.

14. An arrangement for an automotive passenger vehicle having normal front-wheel drive mode and selective on demand four-wheel drive mode, said arrangement comprising:
   a transmission transversely mounted in said vehicle powered by a transversely-mounted vehicle engine;
   a front axle differential powered by said transmission having a casing extending transversely to a main axis of said vehicle, said front axle differential having front wheel shafts connecting with side gears for powering front wheels of said vehicle;
   a rear axle input shaft connected with said front axle differential casing and encircling at least one of said front wheel shafts;
   a rear axle input gear rotatably mounted on said rear axle input shaft for powering a torsionally connected prop shaft;
   a rear axle differential with a ring gear torsionally connected with said prop shaft, said ring gear being connected with a rear casing having drive gears powering side gears connected with said rear wheel shafts, said rear wheel shafts powering rear wheels of said vehicle, said casing also having a clutch connection with one of said rear wheels, said rear axle differential having a first state of operation differentially powering said rear wheels and said rear axle differential having a second state wherein said casing has a disconnected clutch connection with one of said rear wheels to allow said rear wheels to be non-driven and freewheel with respect to one another;

a shift collar mounted within a frame of a power takeoff unit for selectively coupling said rear axle input gear with said rear axle input shaft; said shift collar having a first position torsionally coupling said rear axle input gear with said rear axle input shaft, and said shift collar having a second position uncoupling said rear axle input shaft gear from said rear axle input shaft;

a hydraulic actuator for translating said shift collar including a piston mounted within said frame of said power takeoff unit, said piston having a seal separating an applied pressure chamber and a release pressure chamber, said piston being fabricated from aluminum having a bumper connection with said shift collar and said shift collar being fabricated from steel;

a hydraulic pump torsionally connected with said rear axle input gear for powering said hydraulic actuator; and an accumulator fluidly connected with said pump and said hydraulic accumulator to supply pressurized hydraulic fluid to said actuator when said rear axle input gear is uncoupled from said rear axle input shaft.

15. An arrangement of a hydraulic actuator for translating a shift collar to selectively change an automotive vehicle between normal front-wheel drive operation and selective four-wheel drive operation, said arrangement comprising:

a transmission transversely mounted powered by a transversely mounted vehicle engine, said shift collar selectively coupling a driving member with a rear axle input gear wherein said shift collar having a first position torsionally connecting said driving member with said rear axle input gear, and a second position decoupling said driving member with said rear axle input gear, said actuator including a piston located within a power takeoff unit, said piston having a leg aligned in an axial groove of the power takeoff unit and said piston having:

a seal sealed at a radius of the power takeoff unit and said piston having another seal dividing pressurized chambers for applying and releasing said piston, and said piston having a third seal for sealing said chamber for releasing said rear axle input gear from said driving member.

* * * * *